Aug. 19, 1930.                L. A. HOERR ET AL                1,773,142
                                 PIPE CLAMP
                              Filed Aug. 24, 1927

INVENTORS
L.A. HOERR
F.K. HABENICHT
BY
ATTORNEY

Patented Aug. 19, 1930

1,773,142

UNITED STATES PATENT OFFICE

LOUIS A. HOERR AND FREDERICK K. HABENICHT, OF ST. LOUIS, MISSOURI, ASSIGNORS TO WESTERN RAILWAY EQUIPMENT COMPANY, OF ST. LOUIS, MISSOURI, A CORPORATION OF MISSOURI

PIPE CLAMP

Application filed August 24, 1927. Serial No. 214,996.

Our invention relates to a pipe clamp and is particularly adapted for securing a train pipe in the cross bearers of a railway car so as to effectively prevent vibration or other movement of the pipe relative to the bearer. As the pipe openings in the cross bearers in cars are not of uniform diameter, it is one object of our invention to so construct the clamp that it will compensate for the necessary variation in the size of the openings.

Another object of our invention is to obviate the use of brackets or other fittings secured to the car or its parts by bolts or similar fastening means and hence requiring the drilling of holes.

Still another object of our invention is to so construct the clamp that it may be formed of pressed metal and preferably of not more than two parts.

Figure 1:
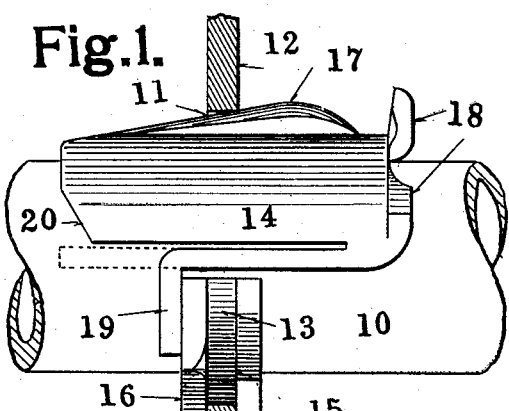
Figure 2:
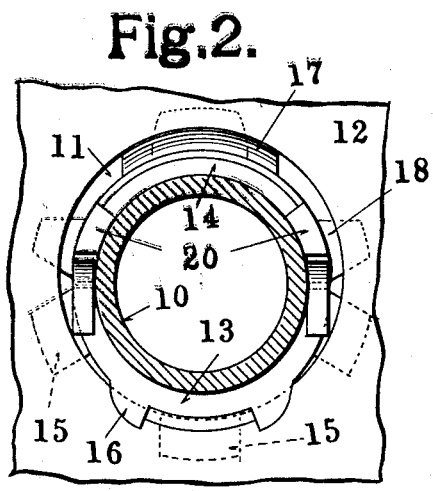
Figure 3:
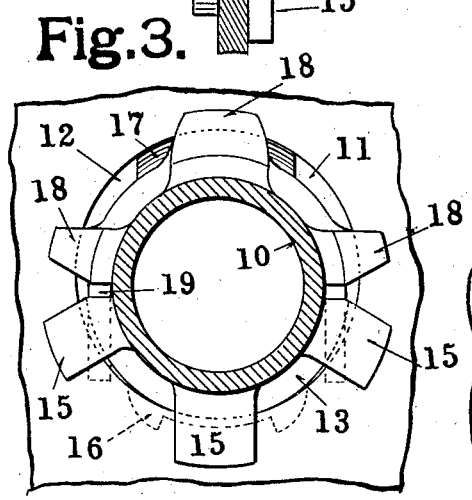
Figure 4:
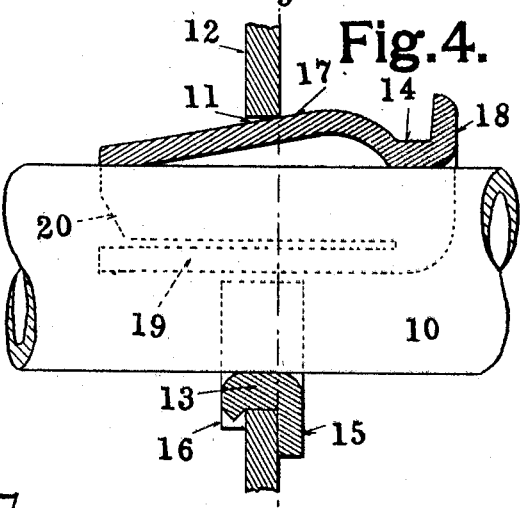
Figure 5:
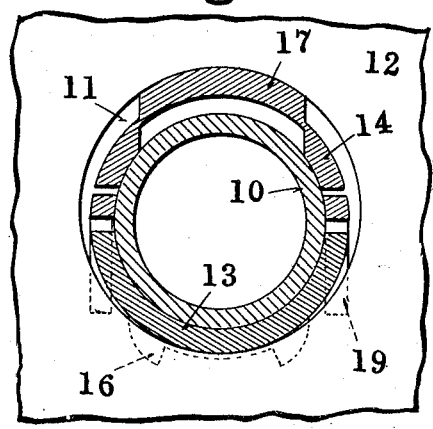

In the accompanying drawings, which illustrate one form of pipe clamp made in accordance with our invention, together with a portion of a train pipe and cross bearer to which it is applied, Figure 1 is a side view, the cross bearer being in section; Figure 2 is a rear end view, the pipe being in section; Figure 3 is a front end view, the pipe being in section; Figure 4 is a vertical longitudinal section, the pipe being in elevation; and Figure 5 is a section taken on the line 5—5 of Figure 4.

The train pipe 10 passes through an opening 11 in the cross bearer 12. This opening is of considerably greater diameter than the external diameter of the pipe, but the diameter of the openings in different cross bearers is not uniform and the variation in size is compensated for by the wedging action of the clamp hereinafter to be described.

Our clamp consists of a short member 13 and a long member 14, each approximately semi-annular in shape. Formed on the front end of the member 13 is a flange consisting of three wing-shaped parts 15. On the rear end is formed a second flange consisting of two wing-shaped parts 16 arranged in alignment with the spaces between the parts 15. The front and rear flanges may both be made continuous instead of being formed of wing-shaped members without affecting the operation of the device but the form shown permits the stamping of the members from a piece of sheet metal, which could not practicably be accomplished if the flanges were continuous. In any case the rear flange should not extend a substantial distance from the body of the member much farther than shown in the drawings so that the member may be readily inserted into position between the pipe and cross bearer.

Formed in the member 14 by stamping up a portion of its material is a wedge 17. This wedge, owing to the manner of its formation, has a slight amount of resilience which is of importance in securing the necessary clamping action of the device. On the front end of the member 14 are three driving lugs 18. These lugs might be made in the form of a continuous flange except that such construction would interfere with the formation of the member by stamping. The member 14 is slotted adjacent to each edge to provide a locking bar 19 and is cut away at points 20 to give access to the ends of the bars so that they may be bent over, as shown in Figure 1, by a hammer or other tool.

The operation of our clamp is as follows: The pipe 10 is forced upwardly against the upper edge of the opening 11 and the member 13 inserted in position by passing the wing members 16 through the opening below the pipe, after which it is allowed to drop into position with the pipe resting against the inner periphery. The rear end of the member 14 is now inserted in the space above the pipe and the member driven in as far as possible by blows on the driving lugs 18, so as not only to take up all play between the parts, but also to slightly compress the resilient wedge. The ends of the locking bars 19 are now bent down against the rear face of the member 13 thus effectively locking the member 14 against forward movement.

Having fully described our invention, what we claim as new and desire to secure by Letters Patent of the United States is:

1. In a device of the class described, the combination with a plate provided with a pipe opening, of a pipe extending through said opening, a pair of clamping members situated in said opening between the pipe and plate, one of said members having a wedge portion entering the opening, whereby longitudinal movement of said member clamps the pipe, means engaging with the plate for limiting the longitudinal movement of one of said members, and interlocking means between the members to prevent their relative longitudinal movement.

2. In a device of the class described, the combination with a plate provided with a pipe opening, of a pipe extending through said opening, a clamping member comprising a pair of faces contacting with the pipe and a resilient part extending between said faces but out of contact with the pipe, said part having its outer face inclined to the axis of the pipe, whereby a spring wedge is provided, and means for preventing the longitudinal movement of the clamping member.

3. In a device of the class described, the combination with a plate provided with a pipe opening, of a pipe extending through said opening, a pair of clamping members in the opening between said pipe and plate, a wedge on one of said members, means for limiting the movement of the other of said members longitudinally with respect to the plate, and interlocking means between said members.

4. In a device of the class described, the combination with a plate provided with a pipe opening, of a pipe extending through said opening, a clamping member in the opening between said pipe and plate, said member having a concave inner face conforming to the pipe and an integral wedge on its outer face, and a malleable locking arm on said member and extending through said opening, said arm being adapted to be bent against the plate at varying points along its length to limit the longitudinal movement of the member.

5. A pipe clamp consisting of two clamping members each approximately semi-annular in form, one of said clamping members being provided with a pair of flanges to limit its longitudinal movement, the other being provided with an integral wedge and a driving lug, and a locking arm carried by one of said clamping members and adapted to be bent into engagement with the other clamping member to prevent relative longitudinal movement of the members.

6. A pipe clamp consisting of two clamping members each approximately semi-annular in form, one of said clamp members being provided with a pair of flanges to limit its longitudinal movement, the other being provided with an integral wedge and a driving lug, and a pair of locking arms carried by said latter member adapted to be bent into engagement with the other clamping member to prevent relative longitudinal movement of the members.

7. The combination with a support having an opening and a pipe extending therethrough, of means for securing said pipe to said support comprising a clamp formed of separate members extending through said opening at opposite sides of the pipe and between which the pipe is clamped, an abutment-lug on one of said members disposed for engagement with one side of the support, the other member forming a wedge engaging the wall of the opening, and means projecting from one of the members and engaging the other member for preventing withdrawal of either member from said opening.

8. The combination with a support having an opening and a pipe extending therethrough, of means for securing said pipe to said support comprising a clamp formed of separate members extending through said opening at opposite sides of the pipe and between which the pipe is clamped, a pair of spaced abutment-lugs on one of said members disposed for engagement with opposite sides of the support, the other member forming a wedge engaging the wall of the opening, and means projecting from one of the members and engaging the other member for preventing withdrawal of the wedge member from said opening.

In testimony whereof, we hereunto affix our signatures, this 20th day of August, 1927.

LOUIS A. HOERR.
FREDERICK K. HABENICHT.